United States Patent [19]

Fujiwara et al.

[11] Patent Number: 5,729,425
[45] Date of Patent: Mar. 17, 1998

[54] HIGH VOLTAGE CAPACITOR AND MAGNETRON HAVING PORCELAIN DIELECTRIC MATERIAL

[75] Inventors: Isao Fujiwara; Setsuo Sasaki, both of Yuri-gun, Japan

[73] Assignee: TDK Corporation, Tokyo, Japan

[21] Appl. No.: 648,764

[22] Filed: May 16, 1996

[30] Foreign Application Priority Data

May 22, 1995 [JP] Japan ................... 7-122835

[51] Int. Cl.$^6$ ............... H01G 4/12; H01G 4/06
[52] U.S. Cl. ............ 361/345; 361/328; 361/314; 361/302; 361/307
[58] Field of Search ................... 361/328, 302, 361/307, 308.2, 311, 320, 321.4, 321.5, 323, 330, 329, 272, 305, 303, 314, 315

[56] References Cited

U.S. PATENT DOCUMENTS

| | | |
|---|---|---|
| 4,370,698 | 1/1983 | Sasaki .................... 361/330 |
| 4,811,161 | 3/1989 | Sasaki et al. . |
| 5,032,949 | 7/1991 | Sasaki et al. . |
| 5,113,309 | 5/1992 | Sasaki et al. . |

FOREIGN PATENT DOCUMENTS

| | | |
|---|---|---|
| 0 259 766 | 3/1988 | European Pat. Off. . |
| 30 29 807 | 2/1981 | Germany . |
| 59-30521 | 8/1984 | Japan . |
| 59-30522 | 8/1984 | Japan . |
| 61-75119 | 5/1986 | Japan . |
| 63-27029 | 2/1988 | Japan . |
| 63-9367 | 2/1988 | Japan . |
| 63-70137 | 5/1988 | Japan . |
| 63-165838 | 10/1988 | Japan . |
| 2-54217 | 4/1990 | Japan . |
| 2-224215 | 9/1990 | Japan . |
| 4-40524 | 4/1992 | Japan . |

*Primary Examiner*—Leo P. Picard
*Assistant Examiner*—Anthony Dinkins
*Attorney, Agent, or Firm*—Oblon, Spivak, McClelland, Maier & Neustadt, P.C.

[57] ABSTRACT

The present invention is directed to a high voltage capacitor and a magnetron which can reduce the weeping noise resulting from the electrostriction phenomenon while maintaining the function as a filter.

A capacitor constituted with a dielectric porcelain, is provided with through holes which pass through the dielectric porcelain and electrodes on the two surfaces where the through holes open. One of the electrodes is secured onto one surface of a grounding member. Through conductors are connected with electrical continuity to the electrodes by passing through the capacitor and the grounding member. Insulating resins are filled around the capacitor. The relative dielectric constant of the dielectric porcelain is within the range of 3000 to 6000.

4 Claims, 7 Drawing Sheets

HIGH VOLTAGE CAPACITOR AND MAGNETRON HAVING PORCELAIN DIELECTRIC MATERIAL

BACKGROUND OF THE INVENTION

1. Field of the Invention

The present invention relates to a high voltage capacitor and a magnetron provided with a filter constituted with this high voltage capacitor.

2. Discussion of Background

Known examples of this type of high voltage capacitor in the prior art include a high voltage capacitor disclosed in Japanese Unexamined Utility Model Publication (KOKAI) No. 40524/1992. This type of high voltage capacitor is generally structured as follows: two through holes separated by a distance are formed in dielectric porcelain constituting a capacitor. On one of the two surfaces where the through holes in the dielectric porcelain open, separate electrodes that are independent of each other are formed and on the other surface, a common electrode relative to the independent electrodes, is formed. The common electrode is secured onto a step portion of a grounding member by means such as soldering. Through conductors are made to pass through the through holes in the capacitor and the through hole in the grounding member. These through conductors are soldered to the independent electrodes of the capacitor with electrode connectors or the like. An insulating case is fitted around the external circumference of the step portion of the grounding member surrounding the capacitor. Toward another surface of the grounding member, an insulating cover is fitted, surrounding the through conductors. A thermosetting insulating resin such as an epoxy resin is filled into the insulating case in the area inside and outside the capacitor, which is surrounded by the insulating case, to ensure resistance against moisture and insulation.

The main constituent of the dielectric porcelain constituting the capacitor is barium titanate. Such a dielectric porcelain is a ferro-electric substance belonging to the piezoelectric crystal group. A ferro-electric substance belonging to the piezoelectric crystal group has a reverse piezoelectric effect. Because of this, when an AC high voltage is applied to it, mechanical energy is generated inside the dielectric porcelain constituting the capacitor. For instance, when this type of high voltage capacitor is used as a filter in the magnetron of a microwave oven, an AC high voltage is applied to the capacitor to oscillate the magnetron. As disclosed in Japanese Examined Patent Publication No. 9367/1988, for instance, when an AC high voltage is applied, the electrical energy is converted to mechanical energy inside the dielectric porcelain due to the reverse piezoelectric effect mentioned earlier. Thus, the dielectric porcelain expands when a voltage is applied to it and when no voltage is applied, it contracts to its original state. In order to oscillate the magnetron of a microwave oven, a voltage of approximately 4 $kV_{o-p}$, at commercial frequency or at a frequency of 20 to 40 kHz is applied. In addition, immediately before the magnetron starts oscillating, a transient voltage at 0 to 40 $kV_{p-p}$ is applied. Receiving these AC voltages, the dielectric porcelain constituting the capacitor repeats a cycle of expanding and contracting. This phenomenon is referred to as the electrostriction of dielectric porcelain, which is accompanied by electrostriction noise. The electrostriction noise is communicated to the outside as the vibration of air and manifests itself as the so-called "weeping" of the high voltage capacitor.

Of the noises generated during the operation of a microwave oven, the noises emanating from the cooling fan for the magnetron and the motors driving the source transformer and the turntable, for instance, have been considerably reduced. However, due to technical difficulty, no success has been achieved in reducing the weeping noise of the high voltage capacitor. This technical difficulty is partially attributed to the conflict, in a dielectric porcelain, between the desirable characteristics for improving its performance as a filter and the desirable characteristics for reducing weeping noise. Reducing weeping noise in a high voltage capacitor can be achieved by reducing the relative dielectric constant of the dielectric porcelain. However, if the relative dielectric constant of the dielectric porcelain is too small, its characteristics as a filter deteriorate, and the performance of radios, televisions, satellite broadcasting receivers and the like is adversely affected.

SUMMARY OF THE INVENTION

It is an object of the present invention to provide a high voltage capacitor and magnetron with which the weeping noise resulting from the electrostriction phenomenon is reduced while assuring good functioning as a filter.

In order to achieve the object described above, the high voltage capacitor according to the present invention comprises one grounding member, at least one capacitor, at least one through conductor and at least one type of insulating resin. The grounding member is provided with at least one through hole. The capacitor(s) is constituted of dielectric porcelain with at least one through hole passing through the dielectric porcelain and electrodes provided on the two surfaces where the through hole(s) opens. The capacitor(s) is positioned on the grounding member with one of the electrodes secured onto one surface of the grounding member. The through conductor (s) passes through the capacitor(s) and the grounding member and is connected with electrical continuity to the other electrode. The insulating resin is filled around the capacitor(s).

The dielectric porcelain constituting the capacitor has a relative dielectric constant of 3000 to 6000.

The dielectric porcelain of the high voltage capacitor has a composition in which a main constituent is $BaTiO_3$—$BaZrO_3$—$CaTiO_3$—$MgTiO_3$, for instance, with at least one of NiO, $CeO_2$, MnO or $SiO_2$ added.

The magnetron according to the present invention is provided with the high voltage capacitor described above.

The capacitor(s), with one of its electrodes secured onto one surface of the grounding member, is provided on the grounding member. The through conductor(s) passes through the capacitor(s) and the grounding member and is connected with electrical continuity to the other electrode. As a result, when it is used in a magnetron in a microwave oven, a high voltage capacitor with the through conductor(s) functioning as a power supply terminal and the capacitor (s) connected between this through conductor(s) and a grounding member which functions as a ground potential to absorb the noise passing through the through conductor(s) with the filtering effect of the capacitor(s), is achieved.

The grounding member is provided with at least one through hole and the capacitor(s) is provided with at least one through hole passing through the dielectric porcelain. Consequently, with the through holes, sufficient electrical insulation is achieved between the through conductor(s), whose potential is high relative to that of the ground potential, and the grounding member which functions as a ground potential, and between the through terminal and one of the electrodes of the capacitor(s).

Since an insulating resin is filled around the capacitor (s), the reliability improves, as confirmed in reliability tests such as high temperature load tests and moisture resistance load tests, or when used in a high temperature, high humidity environment.

The relative dielectric constant of the dielectric porcelain constituting the capacitor(s) is 3000 to 6000. If the relative dielectric constant is smaller than 3000, while the weeping noise level is reduced, sufficient function as a filter capacitor cannot be assured. If the relative dielectric constant exceeds 6000, while its function as a filter capacitor improves, the weeping noise level exceeds the allowable value of 40 dB.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENTS

Figure 1:
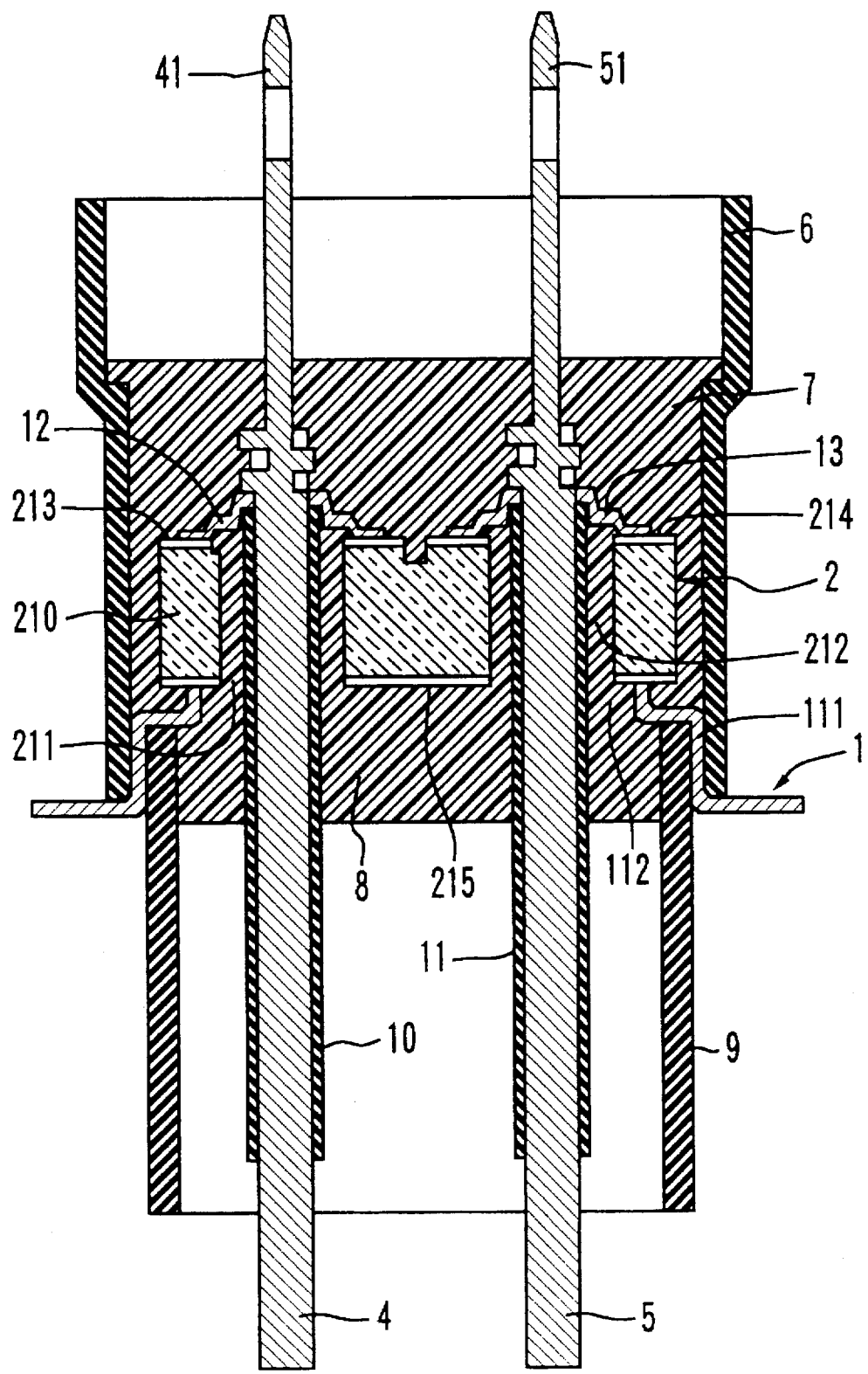
FIG. 1 is a frontal cross section of a high voltage capacitor according to the present invention.
Figure 2:
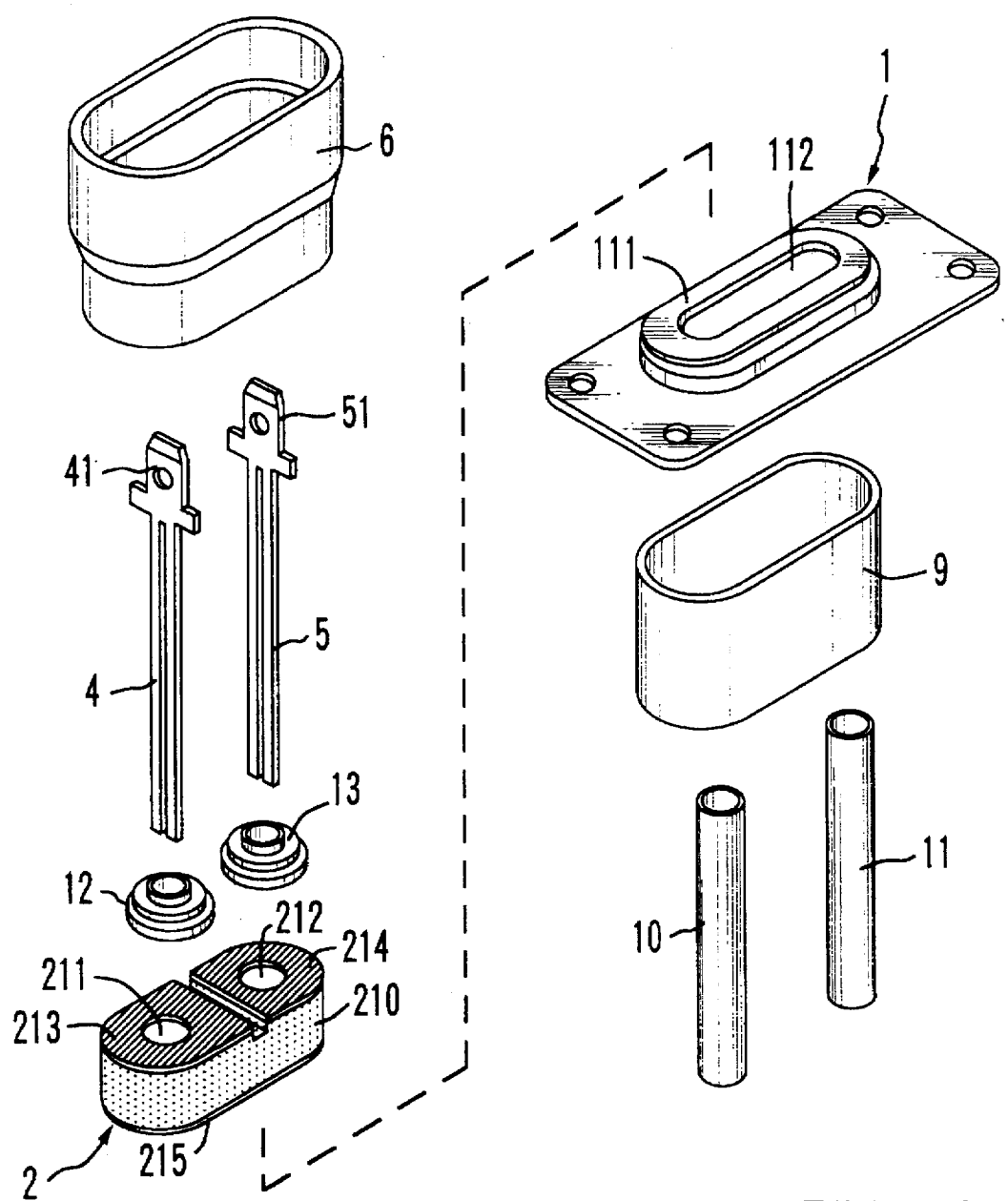
FIG. 2 is an exploded perspective of the capacitor shown in FIG. 1.

The high voltage capacitor shown in FIGS. 1 and 2 is provided with a grounding member 1, a capacitor 2, through conductors 4 and 5, an insulating case 6, an external insulating resin 7, an internal insulating resin 8, an insulating cover 9 and insulating tubes 10 and 11 constituted of silicon or the like.

The grounding member 1 is provided with a step portion 111 on one surface, with the step portion 111 having a hole 112. The capacitor 2 is positioned on the step portion 111 and an electrode 215 is secured onto the step portion 111 by means such as soldering. The through conductors 4 and 5 pass through the insides of through holes 211 and 212 and the hole 112 of the step portion 111 and are connected with electrical continuity to electrodes 213 and 214 via electrode connectors 12 and 13 respectively. The external insulating resin 7 is filled around the capacitor 2 toward one surface of the grounding member 1 and adheres to a surface of the dielectric porcelain 210. The internal insulating resin 8 is filled inside the through holes 211 and 212 of the capacitor 2 on another surface of the grounding member 1 and adheres to a surface of the dielectric porcelain 210. The external insulating resin 7 and the internal insulating resin 8 may be constituted of a thermosetting resin such as an urethane resin, an epoxy resin or the like. Furthermore, it is also acceptable to use a phenol resin, a silicon resin or the like. The insulating tubes 10 and 11 are provided covering the portions of the through conductors 4 and 5 that are inside the through holes 211 and 212. The conductors 4 and 5 have terminal sections 41 and 51 at their upper ends.

The insulating case 6 and the insulating cover 9 may be constituted with polybutylene terephthalate, polyethylene terephthalate or denatured melanin. The insulating case 6 is fitted onto the external circumference of the step portion 111 of the grounding member 1. The insulating cover 9 is fitted into the internal circumference of the step portion 111 of the grounding member 1. The external insulating resin 7 is filled outside the capacitor 2 and the internal insulating resin 8 is filled inside the through holes 211 and 212 of the capacitor 2.

The relative dielectric constant of the dielectric porcelain 210 constituting the capacitor 2 is 3000 to 6000. A specific example of such a dielectric porcelain 210 has a composition with $BaTiO_3$—$BaZrO_3$—$CaTiO_3$—$MgTiO_3$ as a main constituent with at least one of $NiO$, $CeO_2$, $MnO$ and $SiO_2$ added.

The capacitor 2 is provided on the grounding member 1 with its electrode 215 secured onto one surface of the grounding member 1. The through conductors 4 and 5 pass through the capacitor 2 and the grounding member 1 and are connected with electrical continuity to the electrodes 213 and 214 respectively. As a result, when it is used in a magnetron in a microwave oven, a high voltage capacitor, with the through conductors 4 and 5 functioning as a power supply terminal and the capacitor 2 connected between the through conductors 4 and 5 and the grounding member 1 which functions as a ground potential, to absorb the noise passing through the through conductors 4 and 5 with the filtering effect of the capacitor 2, is achieved.

The grounding member 1 is provided with at least one through hole 112, and the capacitor 2 is provided with at least one through hole 211 or 212 that passes through the dielectric porcelain 210. Consequently, with the through holes 211 and 212, sufficient electrical insulation is achieved between the through conductors 4 and 5, whose potentials are high relative to that of the ground, and the grounding member 1, which functions as a ground potential, and also between the through conductors 4 and 5, and the electrode 215 of the capacitor.

Since the external insulating resin 7 and the internal insulating resin 8 are filled around the capacitor 2, the reliability improves, as confirmed in reliability tests such as high temperature load tests and moisture resistance load tests or when used in a high temperature, high humidity environment.

The relative dielectric constant of the dielectric porcelain 210 constituting the capacitor 2 is 3000 to 6000. If the relative dielectric constant is smaller than 3000, while the weeping noise level is reduced, sufficient function as a filter capacitor cannot be assured. If the relative dielectric constant exceeds 6000, while its function as a filter capacitor improves the weeping noise level exceeds the allowable value of 40 dB, for instance. This point is explained in more detail later.

It is generally known that the level of weeping noise of this type of high voltage capacitor is in proportion to a pseudo d constant. The pseudo d constant refers to the piezoelectric distortion constant, which is referred to as the d constant when it is adopted in the electrostriction phenomenon, and is expressed as the value achieved by dividing the generated distortion by the intensity of the applied electrical field. Consequently, the pseudo d constant can be expressed as:

$$\text{pseudo } d \text{ constant} = \frac{kp}{2 \cdot fr \cdot D} \cdot \sqrt{\frac{\epsilon 0 \cdot \epsilon S}{\rho}} \quad (m/v)$$

where;
- kp is the electro-mechanical coupling factor;
- fr is the resonance frequency;
- D is the diameter of the dielectric porcelain 210;
- ε0 is the dielectric constant in a vacuum;
- εs is the relative dielectric constant of the dielectric porcelain 210; and
- ρ is the density of the dielectric porcelain 210.

As is obvious from the expression above, the larger the relative dielectric constant εs of the dielectric porcelain 210, the larger the pseudo d constant, resulting in a higher level of weeping noise in the dielectric porcelain 210. This means that in order to reduce the weeping noise of the high voltage capacitor, the relative dielectric constant εs of the dielectric porcelain 210 must be reduced.

However, if the relative dielectric constant εs of the dielectric porcelain 210 is too low, the function of the capacitor 2 as a filter is reduced. For this reason, if such a high voltage capacitor is used as a filter in a magnetron of a microwave oven, a sufficient noise reducing effect cannot be achieved and the performance of radios and televisions, satellite broadcast receivers and the like is adversely affected. If the relative dielectric constant εs is within the range of 3000 to 6000, on the other hand, the weeping noise and the noise filtering effect can both be contained within acceptable ranges. This point is explained in further detail below.

Table 1 shows the relationship between the signal noise which is allowed within a specific frequency range and the signal noise in the high voltage capacitor according to the present invention which employs the dielectric porcelain 210 with the relative dielectric constant εs as entered in the table.

TABLE 1

| Frequency range | 41 MHz–68 MHZ | 68 MHz–174 MHz |
|---|---|---|
| Allowable noise level | 30 dB μV/m | 54 dB μV/m |
| RDC | noise level | noise level |
| 7000 | 15.0–19.0 dB μV/m | 10.0–12.0 dB μV/m |
| 6000 | 16.0–18.5 dB μV/m | 11.0–12.0 dB μV/m |
| 4000 | 21.0–25.0 dB μV/m | 19.0–23.0 dB μV/m |
| 3000 | 23.0–27.0 dB μV/m | 17.5–26.5 dB μV/m |
| 2000 | 31.0–32.0 dB μV/m | 29.0–32.0 dB μV/m |

| Frequency range | 790 MHz–1000 MHZ | 5th harmonics |
|---|---|---|
| Allowable noise level | not specified | 57 dB μV/m |
| RDC | noise level | noise level |
| 7000 | 27.5–35.0 dB μV/m | 51.5–54.0 dB μV/m |
| 6000 | 29.5–35.0 dB μV/m | 51.0–54.0 dB μV/m |
| 4000 | 41.0–45.0 dB μV/m | 52.0–56.0 dB μV/m |
| 3000 | 40.0–47.5 dB μV/m | 54.0–57.0 dB μV/m |
| 2000 | 44.5–51.0 dB μV/m | 57.5–59.5 dB μV/m |

In the above table, RDC refers to relative dielectric constant.

The data on noise measurement presented in Table 1 are obtained in regard to radiated noise at 30 MHz or over in the frequency ranges dependent on the dielectric constant εs. For the signal noise measurement, the 30 m method and the 10 m method were employed in conformance with VDE/FTZ Standards. The allowable signal noise level in the 41 to 68 MHz frequency range is 30 dB μV/m and the allowable signal noise level in the 68 to 174 MHz frequency range is 54 dB μV/m. The allowable signal noise level in the fifth harmonics is 57 dB μV/m. The allowable signal noise level in the 790 to 1000 MHz frequency range is not yet defined. The results shown in Table 1 are shown in a graph in FIG. 3.

Figure 3:
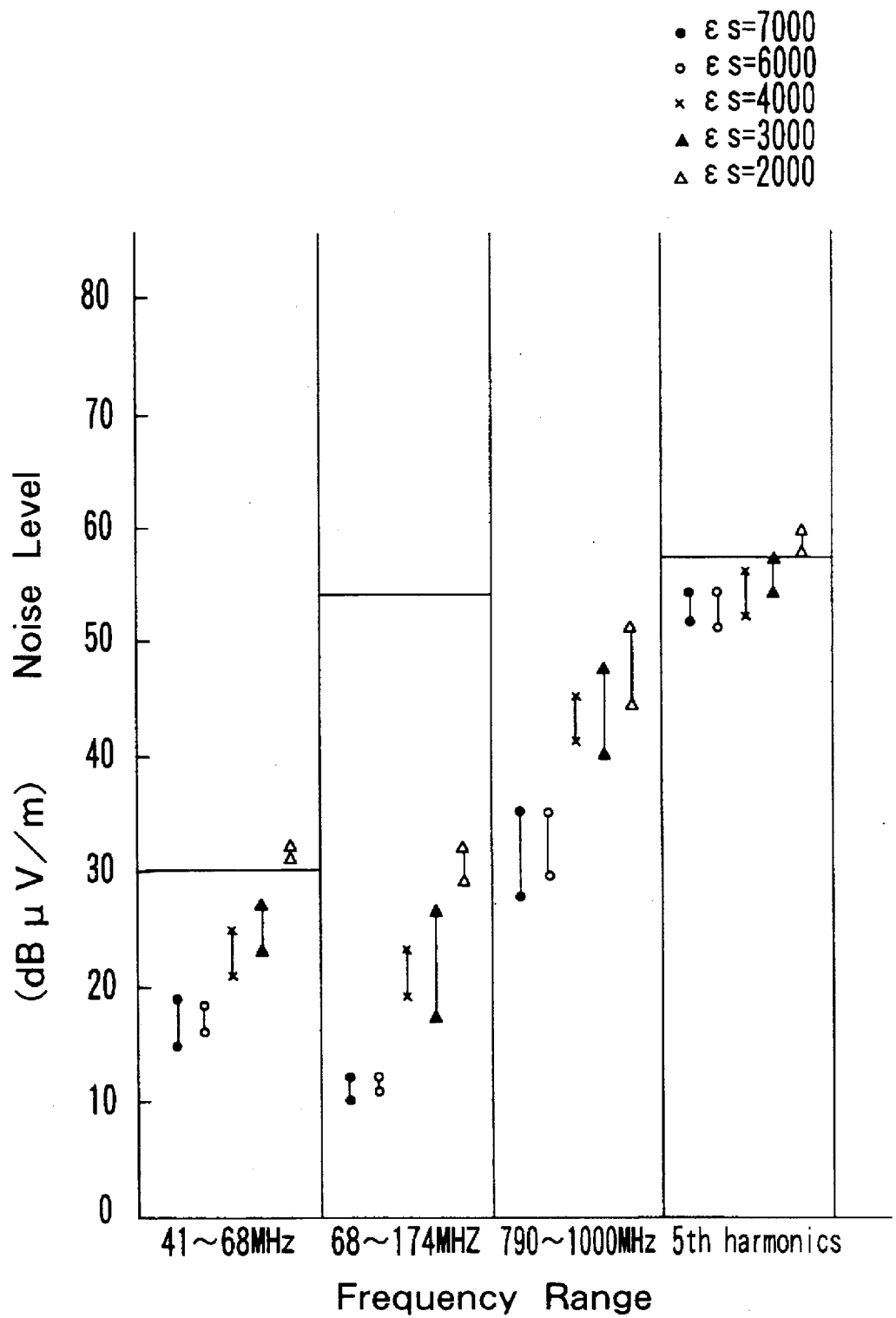
FIG. 3 is a diagram showing the frequency-noise characteristics as the relative dielectric constant of the dielectric porcelain is varied in the high voltage capacitor shown in FIGS. 1 and 2.

As is obvious from Table 1 and FIG. 3, in a high voltage capacitor using the dielectric porcelain 210 with a relative dielectric constant εs at 3000 or over, the signal noise levels are lower than the respective allowable signal noise level in the frequency ranges of 41 to 68 MHz, 68 to 174 MHz and in the fifth harmonics. In contrast, in a high voltage capacitor employing the dielectric porcelain 210 with a relative dielectric constant εs at 2000, the signal noise level is 31.0 to 32 dB μV/m, higher than the allowable signal noise level of 30 dB μV/m, in the frequency range 41 to 68 MHz, and the signal noise level is 57.5 to 59.5 dB μV/m, higher than the allowable signal noise level of 57 dB μV/m in the fifth harmonics. This confirms that in order to reduce the signal noise to a lower level than the specified value, it is necessary to set the relative dielectric constant εs of the dielectric porcelain 210 constituting the high voltage capacitor at 3000 or more.

Figure 4:
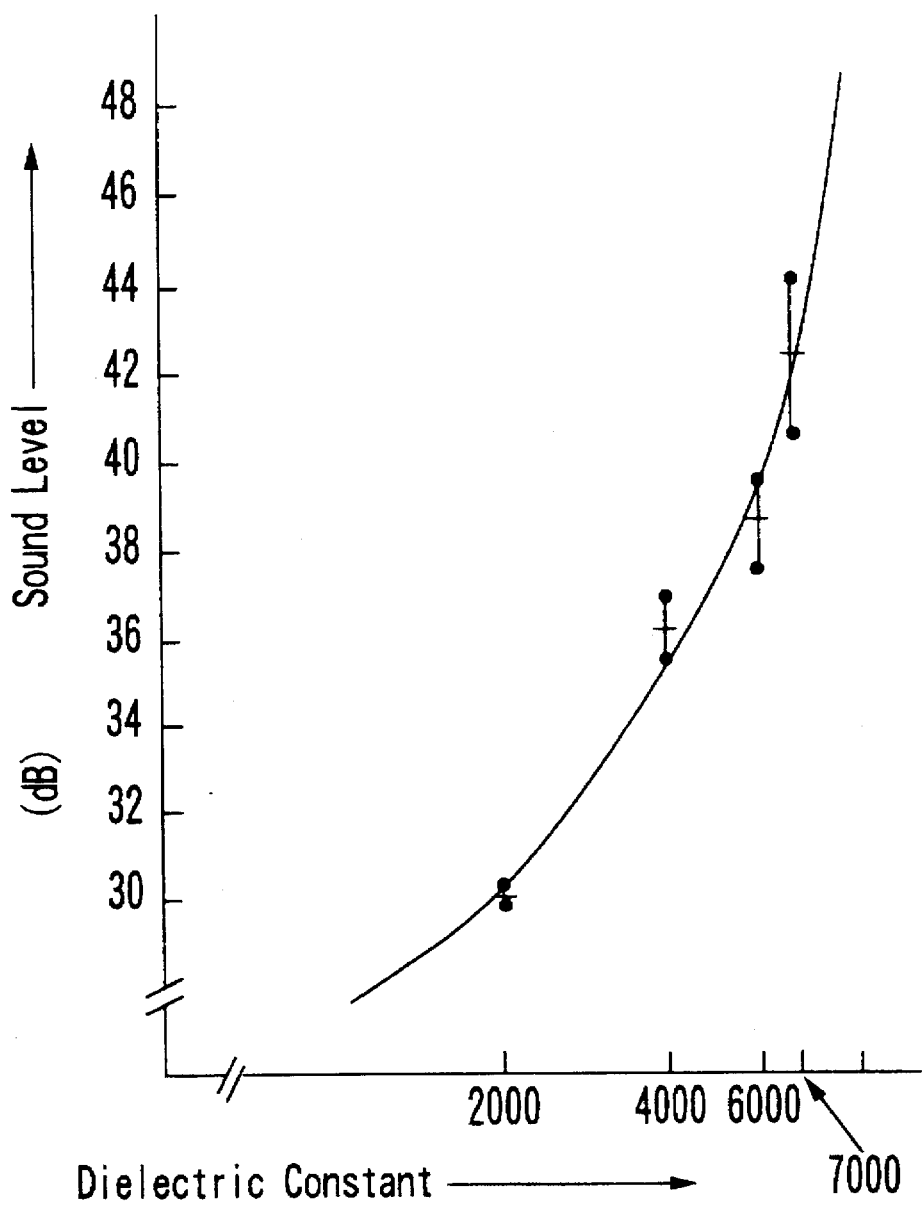
FIG. 4 is a diagram showing the relative dielectric constant-weeping noise level characteristics as the relative dielectric constant of the dielectric porcelain is varied in the high voltage capacitor shown in FIGS. 1 and 2.

FIG. 4 presents measurement data which indicate the relationship between the relative dielectric constant εs of the dielectric porcelain 210 constituting the high voltage capacitor and the weeping noise level. FIG. 4 clearly demonstrates that when the relative dielectric constant εs exceeds 6000, the weeping level increases dramatically. Consequently, in order to prevent such an increase in the weeping noise level and to achieve a high voltage capacitor with a low weeping noise level, it is essential that a dielectric porcelain 210 with a relative dielectric constant εs at 6000 or lower be used.

The high voltage capacitor according to the present invention is not limited to the one illustrated in the figures. For instance, the present invention may be widely adopted in known technologies such as those disclosed in Japanese Utility Model Publication Nos. 21430/1993, 21431/1993, 23525/1993, 25718/1993, 28021/1993, 33519/1993, 28021/1993, 23237/1994 and 23238/1994, and also in high voltage capacitors which may be disclosed in the future.

Now, a second embodiment of the invention will be described with reference to FIGS. 5 and 6. In the figures, reference numerals designating the same parts as those in FIGS. 1 and 2 are the same. Reference numerals 2 and 3 are capacitors, 71 and 72 is an external insulating resin and 81 and 82 is an internal insulating resin.

The grounding member 1 has two step portions 101 and 102 formed on the same side. These step portions 101 and 102 have central holes 103 and 104 respectively and are spaced apart from each other.

The two capacitors 2 and 3 have through holes 201 and 301 respectively. Each capacitor also has two electrodes 202 and 203 (or 302 and 303) formed on its opposite end surfaces, where the through hole 201 (or 301) opens. The capacitors 2 and 3 are positioned on the step portions 101 and 102 and the electrodes 203 and 303 are bonded to the step portions 101 and 102 by means of soldering or the like. The capacitors 2 and 3 are made of a dielectric porcelain.

The conductors 4 and 5 pass through the through holes 201 and 301 respectively of the capacitors 2 and 3 and are independently connected to the electrodes 202 and 302 thereof. They also pass through the central holes 103 and 104 of the step portions 101 and 102 of the grounding member 1 in a contact-free state, and their opposite end portions are led out to the outside.

The conductors 4 and 5 are connected to electrodes 202 and 203 via electrode connectors 12 and 13, respectively. The conductors 4 and 5 have terminal sections 41 and 51 at their upper ends.

Figure 5:
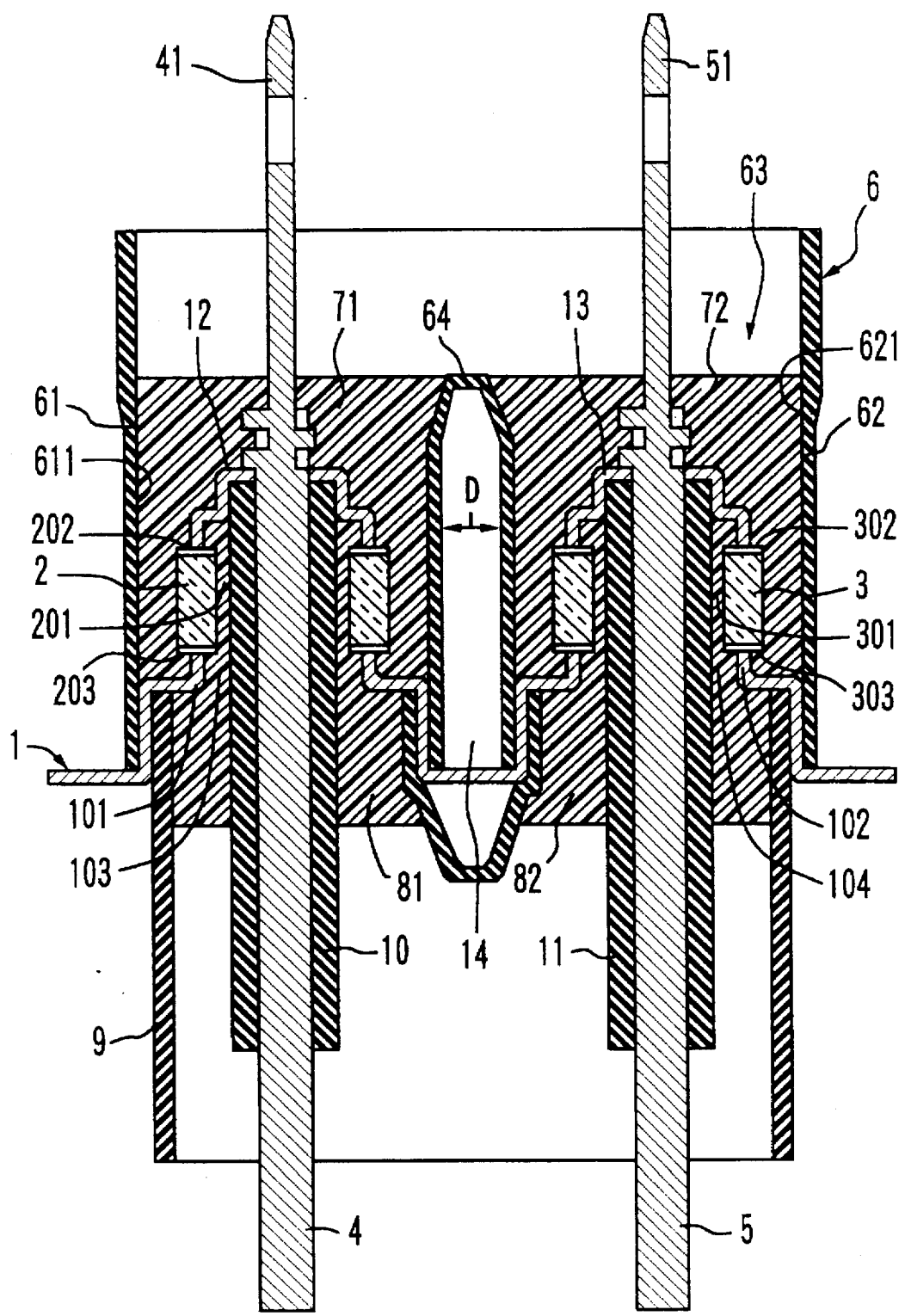
FIG. 5 is a frontal cross section of the high voltage capacitor according to another embodiment of the present invention.
Figure 6:
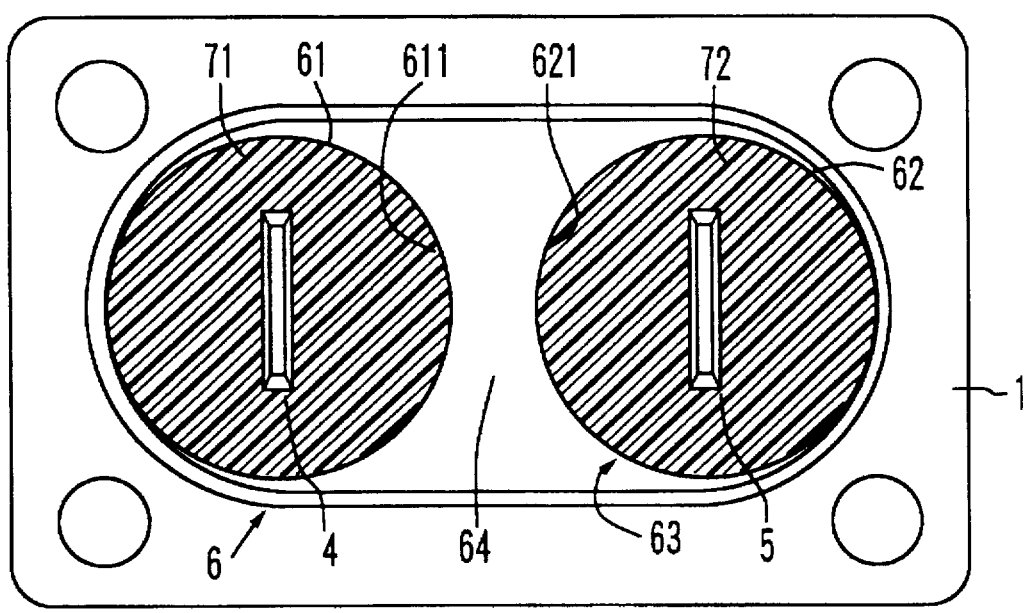
FIG. 6 is a plan view of the high voltage capacitor shown in FIG. 5.

The insulating case 6 has two hollow cylindrical projections 61 and 62, which are spaced apart by a distance D (see FIG. 5). The hollow cylindrical projections 61 and 62 have their upper open ends joined by a joining portion 64, and the insulating case has a recessed enclosure 63 in line with and following inner diameter sections 611 and 621. The hollow cylindrical projections 61 and 62 have their lower open end portions fitted on the outer circumferences of the step portions 101 and 102. The capacitors 2 and 3 are housed within the inner diameter sections 611 and 621.

The external insulating resin 71 and 72 is provided around the capacitors 2 and 3 housed within the inner diameter sections 611 and 621. The external insulating resin 71 and 72 should fill in the area, not spreading too far upward or downward from the joining portion 64 of the insulating case 6. The internal insulating resin 81 and 82 is provided on the side of the grounding member 1 opposite the external insulating resin 71 and 72.

The relative dielectric constant of the dielectric porcelain 210 constituting the capacitors 2 and 3 is 3000 to 6000.

Figure 7:
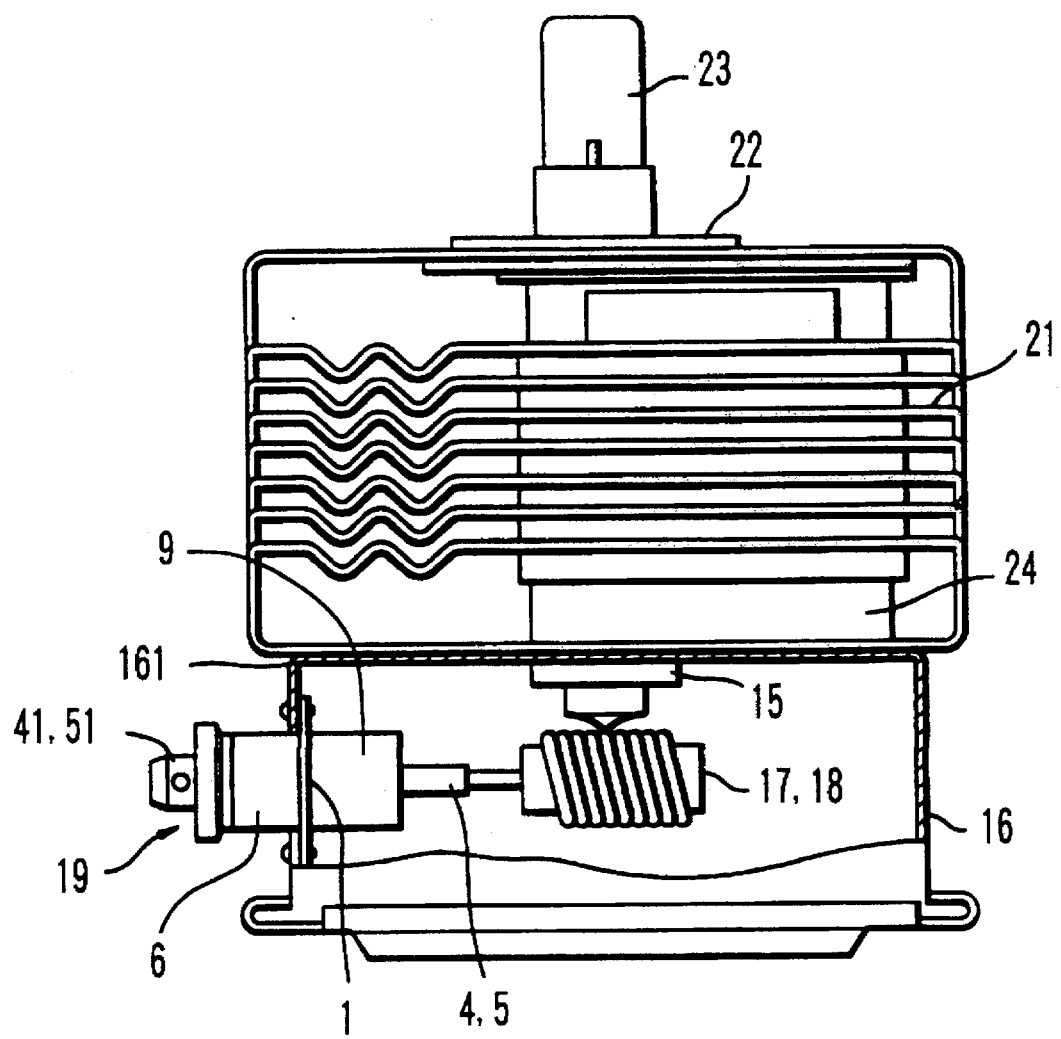
FIG. 7 is a partial cut-away section of a magnetron which is mounted with the high voltage capacitor according to the present invention shown in FIGS. 1 and 2.

FIG. 7 is a partial cut-away section of a magnetron mounted with the high voltage capacitor according to the present invention as a filter, with reference number 15 indicating a cathode stem, 16 indicating a filter box, 17 and 18 indicating inductors, and 19 indicating a high voltage capacitor according to the present invention which, along with the inductors 17 and 18, is used as a filter. The filter box 16 is positioned to cover the cathode stem 15 and the high voltage capacitor 19 is provided, passing through a through hole in a side plate 161 of the filter box 16 so that the external insulating resin 7 is exposed to the outside, and is mounted and secured on the side plate 161 of the filter box 16 at the grounding member 1. The inductors 17 and 18 are connected in series between a cathode terminal of the cathode stem 15 and through conductors 4 and 5 of the high voltage capacitor 19. Reference numbers 21, 22, 23 and 24 respectively indicate cooling fins, a gasket, an RF output terminal and a magnet.

In order to oscillate the magnetron of a microwave oven, a voltage of approximately 4 $kV_{O-P}$ at commercial frequency or a frequency in the range of 20 to 40 kHz is supplied to the through conductors 4 and 5 of the high voltage capacitor 19. This supplied high voltage is then supplied to the magnetron from the through conductors 4 and 5 via the inductors 17 and 18. The signal noise passing through the through conductors 4 and 5 is absorbed by the filter effect of the capacitor 2 and the inductors 17 and 18.

As explained earlier, since the relative dielectric constant of the dielectric porcelain constituting the high voltage capacitor 19 is 3000 or more, even when a voltage of approximately 4 $kV_{O-P}$ at commercial frequency or a frequency in the range of 20 to 40 kHz is applied in order to oscillate the magnetron of the microwave oven, a sufficient signal noise filtering effect is assured.

Furthermore, since the relative dielectric constant εs of the dielectric porcelain constituting the high voltage capacitor 19 is 6000 or lower, the weeping noise resulting from electrostriction is inhibited and it is possible to oscillate the magnetron with the weeping noise level lowered.

As has been explained, according to the present invention, it is possible to provide a high voltage capacitor and a magnetron with which the weeping noise resulting from the electrostriction phenomenon is reduced while maintaining its function as a filter.

What is claimed is:

1. A low signal noise high voltage capacitor comprising one grounding member, at least one capacitor, at least one through conductor and at least one type of insulating resin, wherein;

said grounding member is provided with at least one through hole;

said capacitor is constituted of dielectric porecelain, provided with at least one through hole passing through said dielectric porcelain with electrodes on two surfaces where said through hole opens, said capacitor is positioned on said grounding member with one of said electrodes secured to one surface of said grounding member;

said through conductor passes through said capacitor and said grounding member and is connected with electrical continuity to another of said electrodes;

said insulating resin is filled around said capacitor; and said dielectric porcelain constituting said capacitor has a relative dielectric constant greater than 3000 and less than 6000 in order to reduce weeping noise in said capacitor and to permit said capacitor to adequately function as a filter.

2. A high voltage capacitor according to claim 1, wherein;

said dielectric porcelain has a composition in which the single composition $BaTiO_3$—$BaZrO_3$—$CaTiO_3$—$MgTiO_3$ is a main constituent with at least one of NiO, $CeO_2$, MnO and $SiO_2$ added.

3. A high voltage capacitor according to claim 1, including an insulating tube, an insulating case and an insulating cover, wherein;

said insulating tube is constituted of an elastic resin and is provided covering a portion of said through conductor within said through hole;

said insulating case is positioned toward one surface of said grounding member, with said insulating resin filled therein; and said insulating cover is positioned toward another surface of said grounding member, with said insulating resin filled therein.

4. A magnetron provided with a filter constituted with a high voltage capacitor, wherein;

said high voltage capacitor is a high voltage capacitor according to any one of claims 1 through 3.

* * * * *